(12) United States Patent
Gofton et al.

(10) Patent No.: US 9,701,252 B2
(45) Date of Patent: Jul. 11, 2017

(54) CONSOLE ASSEMBLY

(71) Applicant: Shanghai Yanfeng Jinqiao Automotive Trim Systems Co., Ltd., Plymouth, MI (US)

(72) Inventors: Adam R. Gofton, West Olive, MI (US); Randy L. Arendsen, Zeeland, MI (US)

( * ) Notice: Subject to any disclaimer, the term of this patent is extended or adjusted under 35 U.S.C. 154(b) by 0 days.

(21) Appl. No.: 15/094,810

(22) Filed: Apr. 8, 2016

(65) Prior Publication Data

US 2016/0221511 A1    Aug. 4, 2016

Related U.S. Application Data

(63) Continuation-in-part of application No. PCT/US2013/064037, filed on Sep. 10, 2013.

(51) Int. Cl.
   *B60R 7/04* (2006.01)
   *B60R 7/08* (2006.01)
   *B60R 11/00* (2006.01)

(52) U.S. Cl.
   CPC .............. *B60R 7/04* (2013.01); *B60R 7/082* (2013.01); *B60R 2011/0028* (2013.01)

(58) Field of Classification Search
   CPC .... B60R 7/04; B60R 7/082; B60R 2011/0028
   USPC ........................... 296/37.7, 37.8, 37.12, 37.9
   See application file for complete search history.

(56) References Cited

U.S. PATENT DOCUMENTS

| | | | | |
|---|---|---|---|---|
| 3,240,324 | A * | 3/1966 | Braun | A45C 11/24 132/289 |
| 6,062,623 | A * | 5/2000 | Lemmen | B60R 7/04 224/282 |
| 6,276,737 | B1 | 8/2001 | Cansfield et al. | |
| 2005/0134073 | A1 | 6/2005 | Tokutomi et al. | |
| 2006/0054630 | A1 | 3/2006 | Katagiri | |

OTHER PUBLICATIONS

Written Opinion of the International Search Authority dated Apr. 11, 2014 for PCT/US2013/064037.
International Search Report dated Apr. 3, 2014 for PCT/US2013/064037.

* cited by examiner

*Primary Examiner* — Dennis H Pedder (57) ABSTRACT

A console assembly including a frame and a door is disclosed. The door includes a storage compartment in which an article may be stored. The door is coupled to the frame for movement to the frame between a closed position in which the storage compartment is inaccessible, an opened position in which the storage compartment is accessible to store or remove the article and an intermediate position between the closed position and the opened position. The console assembly further includes a spring coupled to the frame and/or the door and a cam surface on the frame or the door that engages the spring. The spring is compressed by the cam surface when the door is in the opened position to move the door toward the intermediate position.

20 Claims, 7 Drawing Sheets

CONSOLE ASSEMBLY

CROSS REFERENCE TO RELATED APPLICATION

The present application is a continuation in part of PCT Application No. PCT/US2013/64037 titled "CONSOLE ASSEMBLY" filed Oct. 9, 2013. The present application claims priority from and the benefit of and incorporates by reference in entirety the following application: PCT Application No. PCT/US2013/64037 titled "CONSOLE ASSEMBLY" filed Oct. 9, 2013.

FIELD

The present invention relates to a console assembly. The present invention also relates to an overhead console assembly in a vehicle.

BACKGROUND

It is known to provide a console assembly for a vehicle. It is also known to provide a storage compartment in a console of a vehicle. It is further known to provide a storage compartment in an overhead console of a vehicle; such storage compartment may be used for storing small items (e.g. sunglasses).

It would be advantageous to provide for an improved console for a vehicle providing a storage compartment for items.

SUMMARY

The present invention relates to a console for a vehicle interior. The console comprises a base, a compartment coupled to the base for movement between a closed position and an open position for access, a first spring configured to provide a force to actuate the compartment for movement relative to the base and a second spring configured to provide a stop of movement of the compartment between the closed position and the open position. The compartment is configured for movement to a first state with the compartment retained in the closed position; a second state with the compartment under force from the first spring moving to the stop; a third state with the compartment at the stop; a fourth state with the compartment moved beyond the stop against the second spring; a fifth state with the compartment in the closed position.

The present invention also relates to a console for a vehicle interior. The console comprises a base, a compartment comprising a mirror and coupled to the base for movement between a closed position and an open position for access and a spring coupled to the base and configured to provide a force. The compartment is configured for movement to a first state with the compartment in the closed position and the mirror within the base; a second state with the compartment under force from the spring; a third state with the compartment with the mirror deployed from the base; a fourth state with the compartment in the open position. The spring is configured to provide force to move the compartment from the fourth state to the third state.

It would be advantageous to provide an improved console with a storage compartment for a vehicle. The improved storage compartment may provide a spring to move the door towards an intermediate position between the open position and the closed position; articles stored in the storage compartment may be inaccessible when the door is at the closed position; articles stored in the storage compartment are accessible when the door is at the open position. It would also be advantageous to provide a mirror on the surface of the door exposed at the intermediate position (e.g. to allow the driver to have a view of the rear seat occupants); the articles stored in the storage compartment may remain inaccessible when the door is at the intermediate position.

DESCRIPTION

Figure 1A:
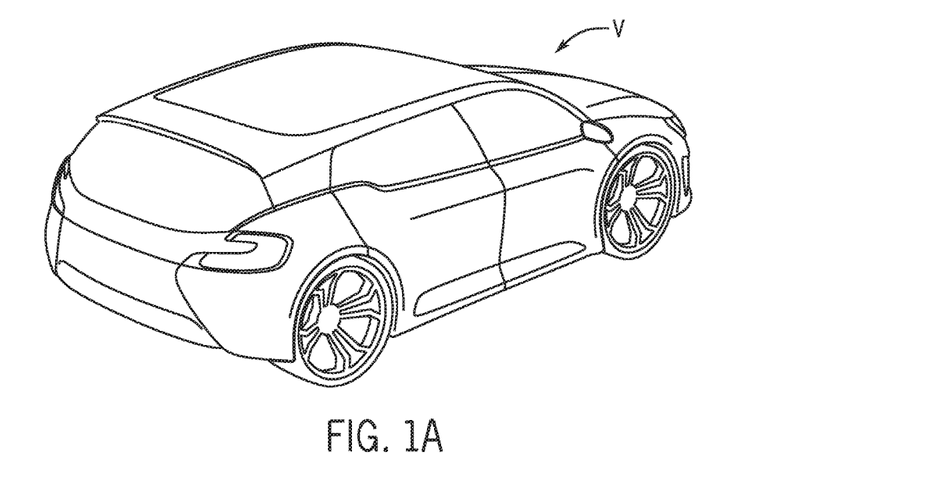
FIG. 1A is a schematic perspective view of a vehicle according to an exemplary embodiment.
Figure 1B:
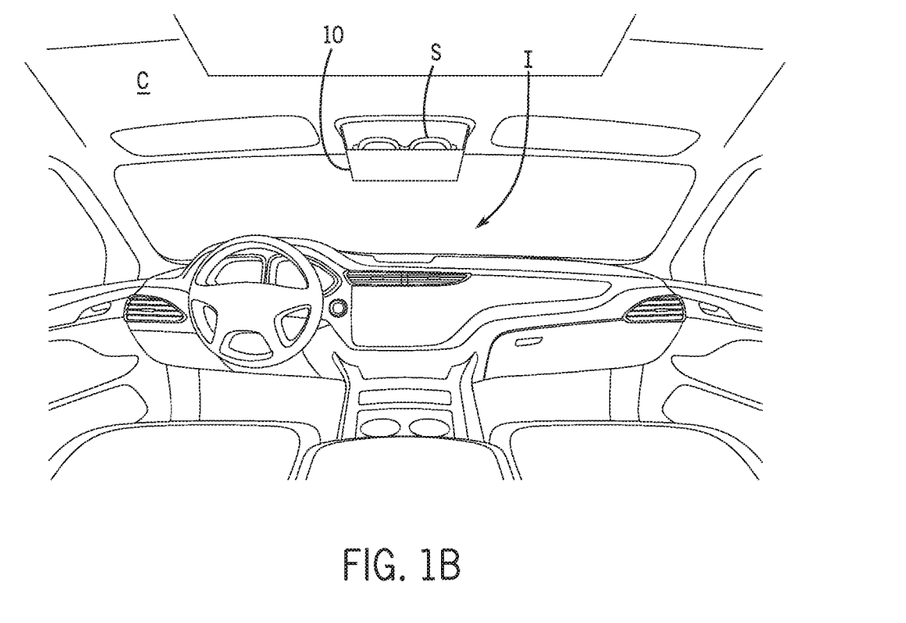
FIG. 1B is a schematic perspective front view of a vehicle interior according to an exemplary embodiment.

Referring to FIGS. 1A and 1B, a vehicle V is shown including an interior I with a console assembly 10 according to an exemplary embodiment. Console assembly 10 is installed on an interior of a roof of vehicle interior I. As shown schematically in FIG. 1B, console assembly 10 shown as an overhead console provides a compartment for storage of items such as sunglasses S.

Figure 2:
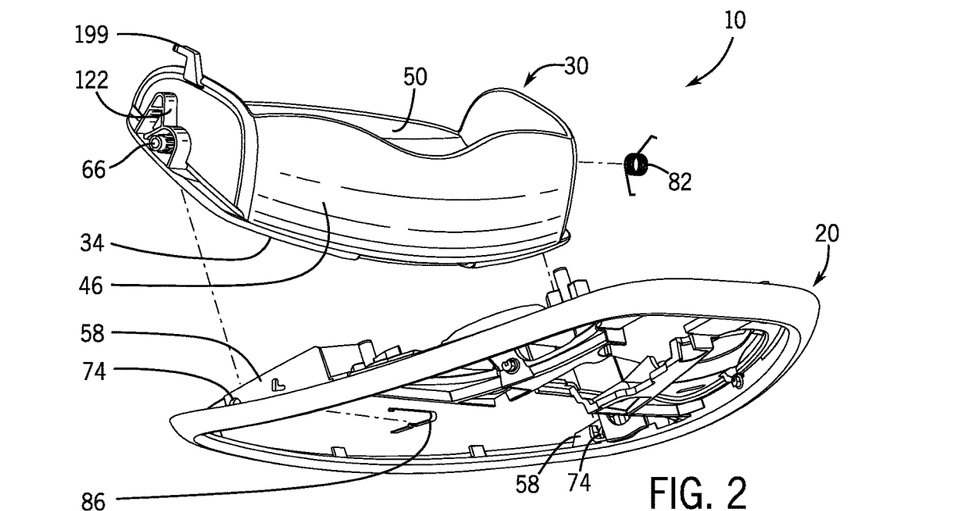
FIG. 2 is a schematic perspective exploded view of an overhead console assembly according to an exemplary embodiment.

As shown schematically in FIG. 2, console assembly 10 shown as an overhead console provides a storage compartment 50. According to an exemplary embodiment, items may be stored in the storage compartment (e.g. sunglasses, etc.). Items inside the storage compartment are inaccessible when the door is at the closed position; items inside the storage compartment are accessible when the door is at the opened position; the door is biased towards an intermediate position between the closed position and the opened position. See FIGS. 4A to 4C.

As shown schematically in FIG. 2, console assembly 10 comprises a base 20 and a door 30 providing a cover 34 for door 30. According to an exemplary embodiment, console assembly 10 provides a hinge mechanism to open and close door 30. According to an exemplary embodiment, items in storage compartment 50 are not accessible at the closed position; items in storage compartment 50 are accessible at the open position. See also FIGS. 4A and 4C. As shown schematically in FIG. 2, the hinge mechanism comprises pins 66 on opposing sides of door 30 to engage holes 74 on corresponding sides of base 20 (e.g. in axial alignment). As shown schematically in FIG. 2, the hinge mechanism also comprises a spring 82 shown as a torsion spring. According to an exemplary embodiment, the hinge mechanism may further comprise a damper to provide smooth door movement; hinge mechanism may comprise springs and dampers on both sides of console assembly.

Figures 2A, 2B, 3:
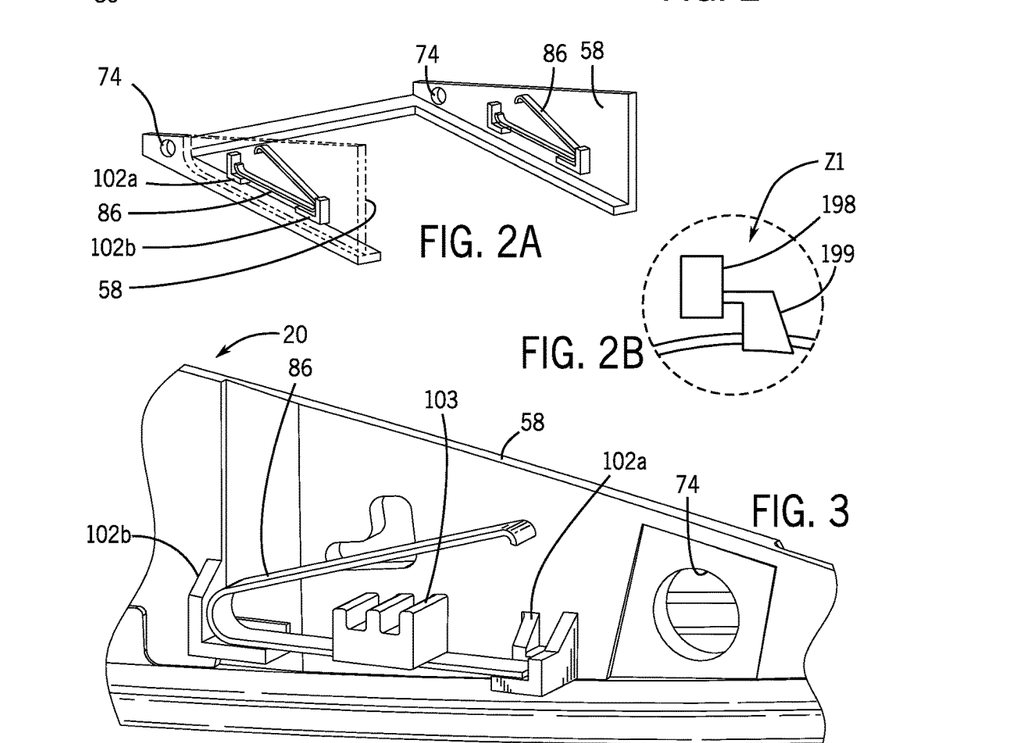
FIG. 2A is a schematic partial cut-away view of the base of the overhead console assembly according to an exemplary embodiment.
FIG. 2B is a schematic side view of a latch arrangement for the assembly according to an exemplary embodiment.
FIG. 3 is a schematic partial perspective view of the base of the overhead console assembly according to an exemplary embodiment.

As shown schematically in FIGS. 2 and 3, console assembly 10 further comprises a spring clip 86 attached to base 20. According to an exemplary embodiment, the spring clip may be on each side of the console assembly. See FIG. 2A.

As shown schematically in FIG. 3, base 20 provides a fixture 58 for spring clip 86; fixture 58 comprises a seat 102a, a seat 102b and a block 103. According to an exemplary embodiment, spring clip 86 comprises two legs; one leg of spring clip 86 is fixed onto base 20 by fixture 58; the other leg of spring clip 86 moves freely to fixture 58. According to an exemplary embodiment, block 103 acts as a stop for spring clip 86 when spring clip 86 is being compressed. See FIGS. 4C and 8C.

Figure 4A:
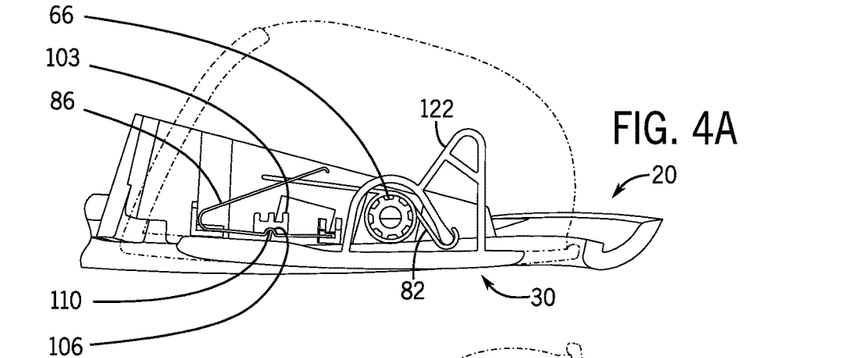
FIGS. 4A to 4C are schematic partial side views of the overhead console according to an exemplary embodiment.

As shown schematically in FIG. 4A, door 30 is held in the closed position by a latch; torsion spring 82 is loaded to provide a torque at an axle 66 towards an intermediate position (e.g. between the closed position and the opened position); spring clip 86 is uncompressed. As shown schematically in FIG. 4A, block 103 may comprise a recess 110; the fixed leg of spring clip 86 may be shaped to follow the contour of recess 110 on block 103 providing more secure attachment for spring clip 86.

Figure 4B:
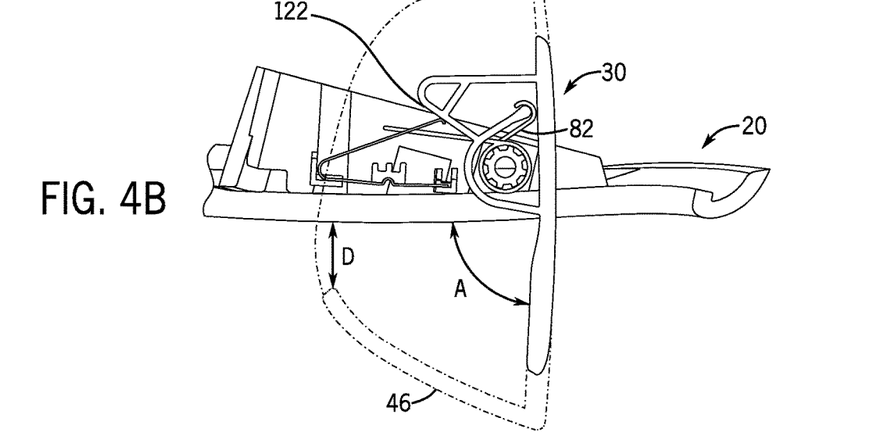

As shown schematically in FIG. 4B, door 30 is at the intermediate position; torsion spring 82 provides torque to rotate door 30; the tip of spring clip 86 engages the surface 122 of door 30. Spring clip 86 is compressed to counteract the force provided by torsion spring 82. As shown schematically in FIG. 4B, the intermediate position is a position where door 30 is at a balanced state (e.g. at equilibrium).

Figure 4C:
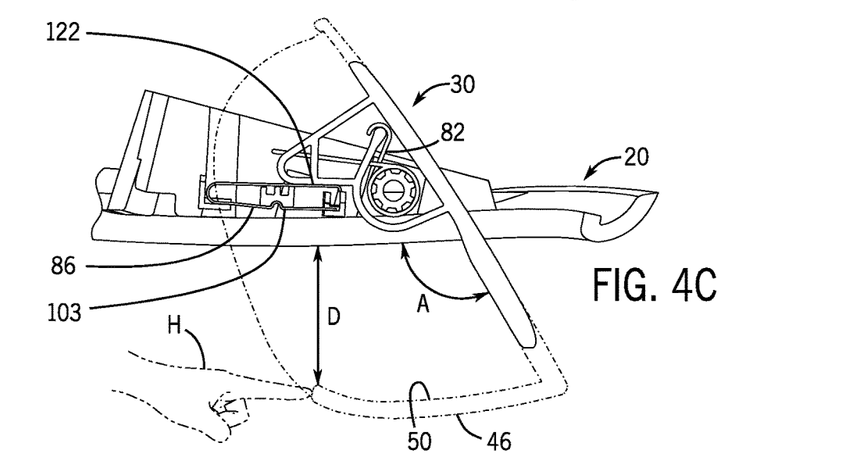

As shown schematically in FIG. 4C, door 30 is at the opened position; a finger from hand H pushes on the end of wall 46 of storage compartment 50 (e.g. to apply a force). The tip of spring clip 86 engages along surface 122 as door 30 moves towards the opened position. As shown schematically in FIG. 4C, spring clip 86 is compressed; the free leg of spring clip 86 is supported by block 103; surface 122 on door 30 engages the free leg of spring clip 86. See FIGS. 4C and 8C. Hand H overcomes forces by spring clip 86 and torsion spring 82. According to an exemplary embodiment, items stored in the storage compartment for the door may be collected/retrieved; items may be stored in the storage compartment at the opened position.

Figure 5:
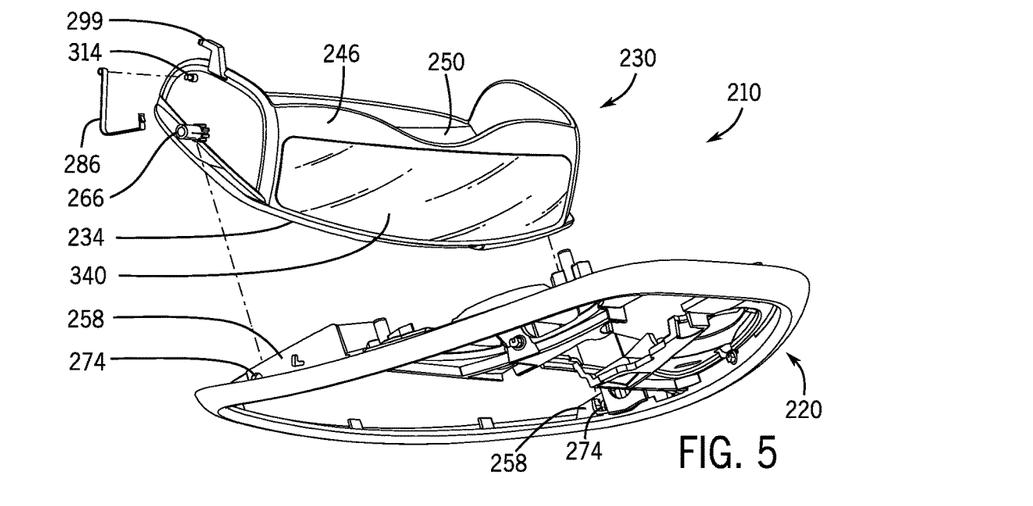
FIG. 5 is a schematic perspective exploded view of the overhead console assembly according to an exemplary embodiment.

As shown schematically in FIG. 5, console assembly 210 shown as an overhead console provides a storage compartment 250. According to an exemplary embodiment, items may be stored in the storage compartment; items inside the storage compartment are inaccessible when the door is at the closed position; items inside the storage compartment are accessible when the door is at the opened position. According to an exemplary embodiment, the door is balanced at an intermediate position between the closed position and the opened position; the door may come to a stop at the intermediate position from the closed position or the opened position. See FIGS. 7A to 7C.

As shown schematically in FIG. 5, console assembly 210 comprises a base 220 and a door 230 providing a cover 234 for door 230. As shown schematically in FIG. 5, door 230 further comprises a reflective surface shown as a conversation mirror 340 (e.g. a mirror which allows the driver to see the occupants in the backseats). According to an exemplary embodiment, console assembly 210 provides a hinge mechanism to open and close door 230. Items in storage compartment 250 are not accessible at the closed position; items in storage compartment 250 are accessible at the open position. See also FIGS. 7A and 7C. As shown schematically in FIG. 5, the hinge mechanism comprises pins 266 on opposing sides of door 30 to engage holes 274 on corresponding sides of base 220 (e.g. in axial alignment). As shown schematically in FIG. 5, the hinge mechanism also comprises a spring shown as a spring clip 286; spring clip 286 rotates axle/pin 266. According to an exemplary embodiment, the hinge mechanism may further comprise a damper to provide smooth door movement; hinge mechanism may comprise springs and dampers on both sides of console assembly. See FIG. 5A.

Figures 5A, 5B, 6:
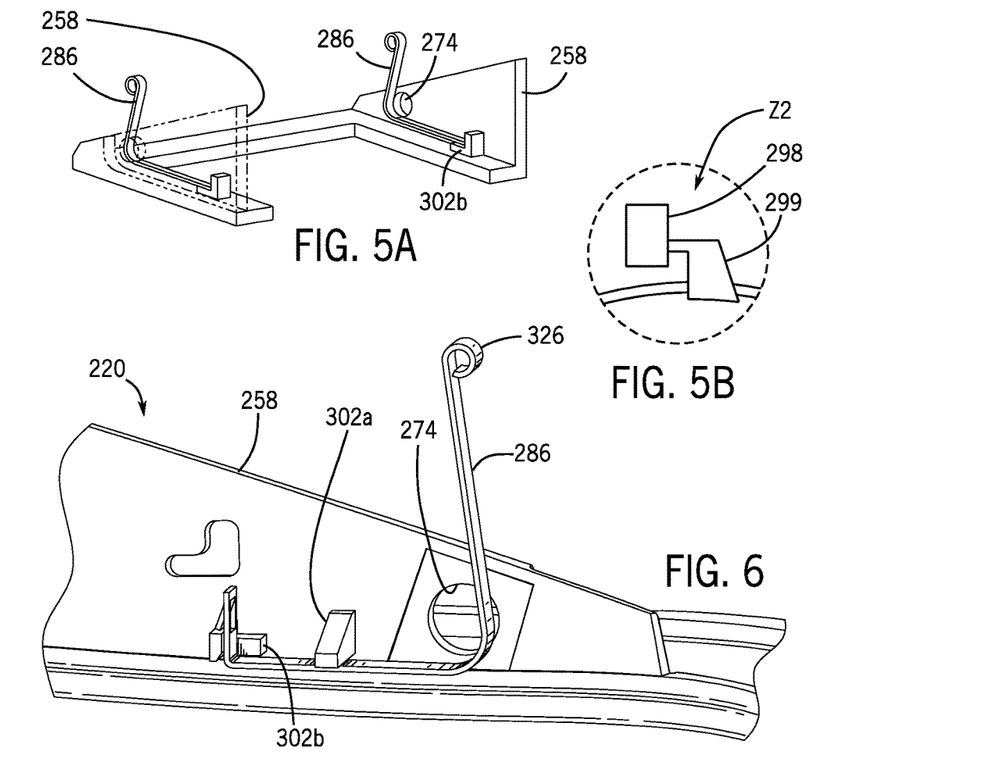
FIG. 5A is a schematic partial cut-away view of the base of the overhead console assembly according to an exemplary embodiment.
FIG. 5B is a schematic side view of a latch arrangement for the assembly according to an exemplary embodiment.
FIG. 6 is a schematic partial perspective view of the base of the console assembly according to an exemplary embodiment.

As shown schematically in FIG. 6, base 220 provides a fixture 258 for spring clip 286; fixture 258 comprises of seat 302a and block 302b. According to an exemplary embodiment, spring clip 286 comprises two legs; one leg of spring clip 286 is attached to base 220; the other leg of spring clip 286 is attached to a pin 314 of door 230 by a round hook at the end of spring clip 286.

Figure 7A:
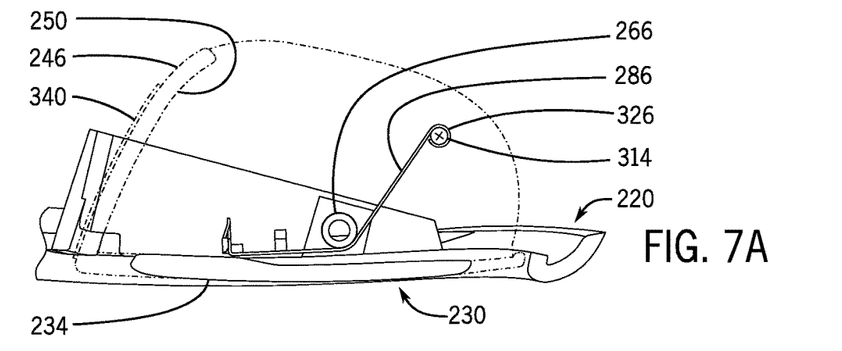
FIGS. 7A to 7C are schematic partial side views of the overhead console assembly according to an exemplary embodiment.

As shown schematically in FIG. 7A, door 230 is held in the closed position by a latch; spring clip 286 is loaded; spring clip 286 is biased towards an intermediate position (e.g. between the closed position and the opened position).

Figure 7B:
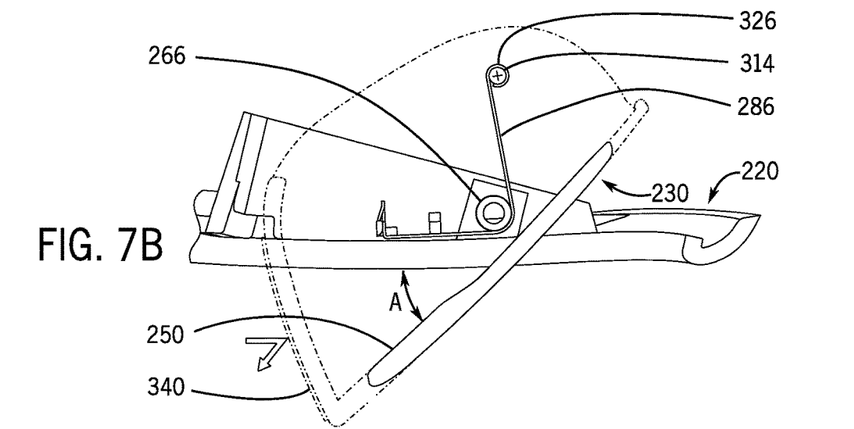

As shown schematically in FIG. 7B, door 230 is at the intermediate position; conversation mirror surface 340 is fully exposed; spring clip 286 provides torque clockwise to counteract the gravity of door 230.

Figure 7C:
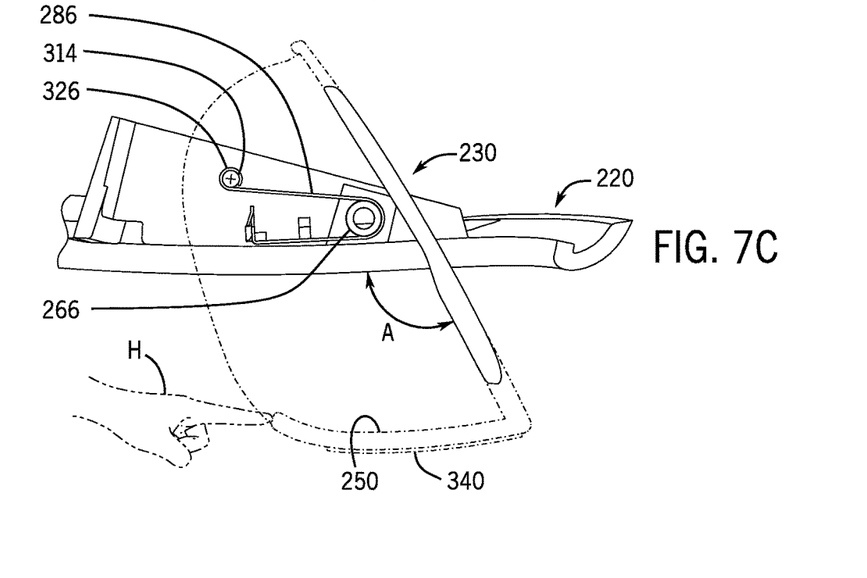

As shown schematically in FIG. 7C, door 230 is at the opened position. A finger of hand H pushes on the end of storage compartment wall 246; hand H overcomes the force provided by spring clip 286. According to an exemplary embodiment, items stored in the storage compartment 250 of door 230 may be collected/retrieved; items may be stored in the storage compartment 250 at the opened position. See FIG. 7C.

Figure 8A:
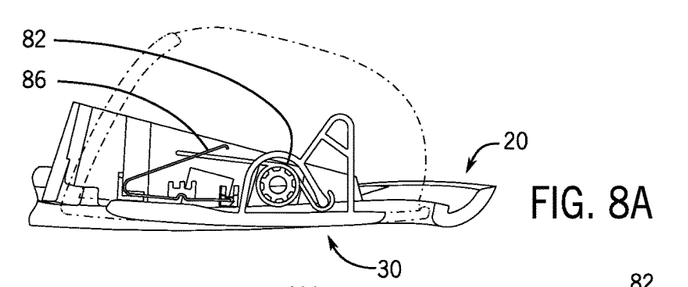
FIGS. 8A to 8D are schematic partial side views of the overhead console assembly according to an exemplary embodiment.

As shown schematically in FIG. 8A, door 30 is held in the closed position by a latch; torsion spring 82 is loaded to provide torque at axle 66 towards an intermediate position (e.g. between the closed position and the opened position); spring clip 86 is uncompressed.

Figures 8B, 8C:
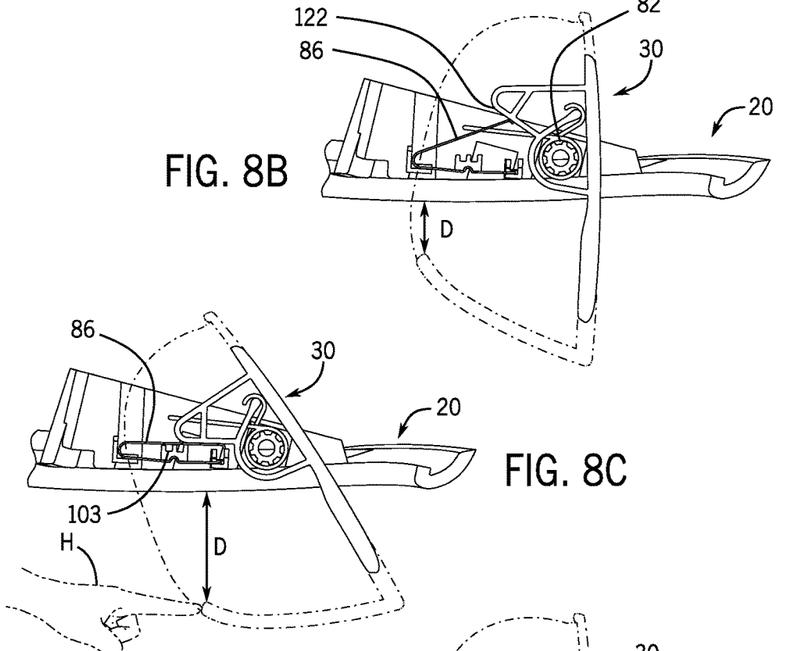

As shown schematically in FIG. 8B, door 30 is at the intermediate position; torsion spring 82 is loaded to rotate door 30; the tip of spring clip 86 engages surface 122 of door 30. Spring clip 86 is compressed to counteract the force provided by torsion spring 82. As shown schematically in FIG. 8B, the intermediate position is door 30 at its balanced state (e.g. at equilibrium).

As shown schematically in FIG. 8C, door 30 is at the opened position; a finger from hand H pushes on the end of wall 46 of storage compartment 50 (e.g. to apply a force). The tip of spring clip 86 engages along surface 122 as door 30 moves towards the opened position. As shown schematically in FIG. 8C, spring clip 86 is compressed; the free leg of spring clip 86 is supported by block 103; surface 122 on door 30 engages the free leg of spring clip 86. See FIGS. 4C and 8C. Hand H overcomes the force provided by spring clip 86 and torsion spring 82. According to an exemplary embodiment, items stored in the storage compartment for the door may be collected/retrieved; items may be stored in the storage compartment at the opened position.

Figure 8D:
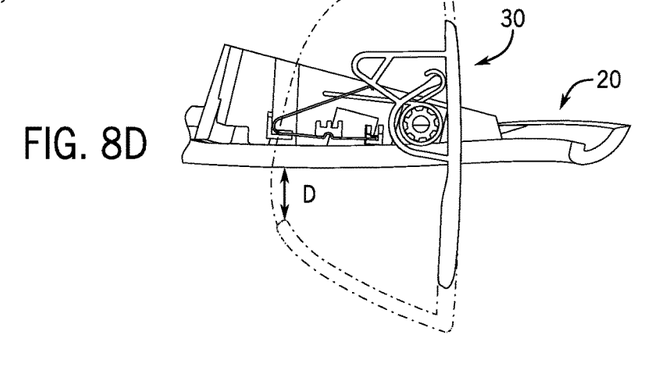

As shown schematically in FIG. 8D, door 30 is at the intermediate position. Door 30 is released from the opened position; hand H is no longer pushing on the door 30. Door 30 returns to the intermediate position (i.e. the equilibrium position).

Figures 9A, 9B, 9C, 9D:
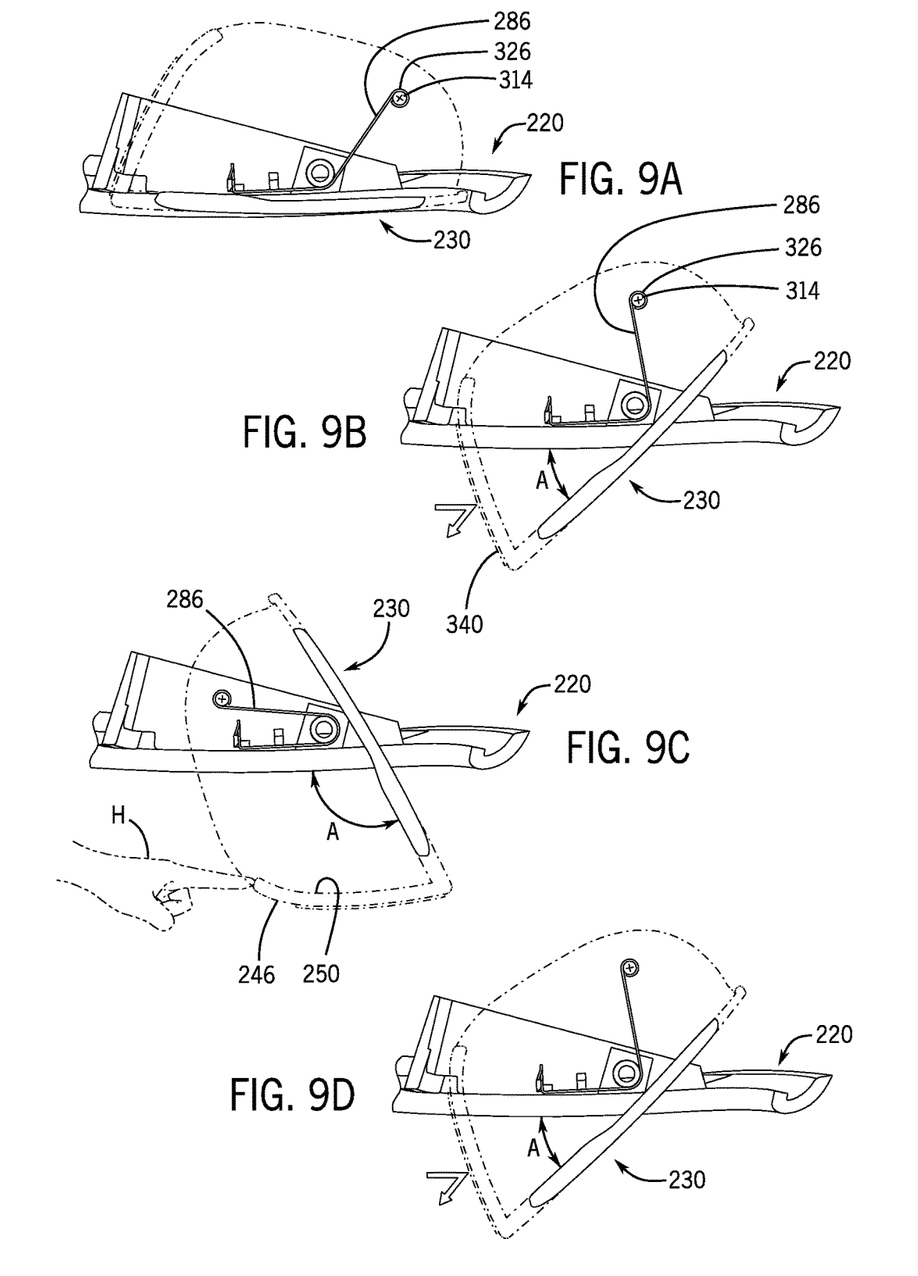
FIGS. 9A to 9D are schematic partial side views of the overhead console assembly according to an exemplary embodiment.

As shown schematically in FIG. 9A, door 230 is held in the closed position by a latch; spring clip 286 is loaded; spring clip 286 is biased towards an intermediate position (e.g. between the closed position and the opened position).

As shown schematically in FIG. 9B, door 230 is at the intermediate position; conversation mirror surface 340 is fully exposed; spring clip 286 provides a force to support the weight of door 230.

As shown schematically in FIG. 9C, door 230 is at the opened position. A finger of hand H pushes on the end of storage compartment wall 246. Spring clip 286 counteracts the force provided by hand H. According to an exemplary embodiment, items stored in the storage compartment 250 of door 230 may be collected/retrieved; items may be stored in the storage compartment 250 at the opened position.

As shown schematically in FIG. 9D, door 230 is at the intermediate position. Door 230 is released from the opened position; hand H is no longer pushing door 230. Door 230 returns to the intermediate position (i.e. the equilibrium position).

According to an exemplary embodiment shown schematically in FIGS. 2 and 2B and 5 and 5B, the console assembly may comprise a latch arrangement (e.g. conventional arrangement for latch for a door between the base and the compartment). As shown schematically in FIG. 2B, the latch arrangement Z1 may comprise latch components such as seat/receptacle 198 for arm 199 (e.g. engaging post or arm with a seat or receptacle as in a conventional latch arrangement); as shown schematically in FIG. 5B, the latch arrangement Z2 may comprise latch components such as seat/receptacle 298 for arm 299 (e.g. engaging post or arm with a seat or receptacle as in a conventional latch arrangement). See also FIGS. 2 and 5.

Exemplary Embodiments

According to an exemplary embodiment, a console assembly includes a frame and a door. See FIG. 2. The door includes a storage compartment with a space to store small items (see FIG. 2). The door is attached to the frame for movement between a closed position (e.g. the storage compartment is substantially inaccessible) (see FIG. 4A) and an open position (e.g. the storage compartment is accessible to store or remove items) (see FIG. 4C) and an intermediate position (e.g. between the open position and the closed position) (see FIG. 4B). According to an exemplary embodiment, the console assembly further includes a spring coupled to the frame. See FIG. 3. A cam surface on the door may be engaged with the spring; the spring is compressed by the cam surface when the door is in the opened position to bias the door toward the intermediate position. See FIG. 4C. According to an exemplary embodiment, the spring may be coupled to the door; the cam surface may be on the frame.

According to an exemplary embodiment, console assembly includes a frame and a door with a mirror. See FIG. 5. The door includes a storage compartment with a storage space that stores small items. See FIG. 5. The door is coupled to the frame to move the frame between a closed position (the storage compartment and the mirror are substantially inaccessible) (see FIG. 7A) and an opened position (the storage compartment is accessible to store or remove items) (see FIG. 7C); an intermediate position is between the closed position and the opened position (where the mirror is substantially exposed) (see FIG. 7B). The console assembly further includes a spring coupled to the frame and the door; the spring biases the door toward the intermediate position. See FIG. 5.

As shown schematically in FIG. 2, an overhead console assembly 10 is suitable for installation on an interior of roof of vehicle V. The console assembly 10 may be installed near a rearview mirror of the vehicle and centered between the front seats for easy access to the console assembly 10 by the occupants of the vehicle. According to an exemplary embodiment, the console assembly may be used for other applications (e.g. airplanes, boats, etc.) and in different orientations (e.g. upside down or sideways).

As shown schematically in FIG. 2, console assembly 10 includes a bezel/base/frame 20. According to an exemplary embodiment, the bezel/base/frame may include mounting locations for supporting one or more task lights, electronic displays, remote control devices (e.g. door openers), and/or other vehicle accessories. According to an exemplary embodiment, the bezel/base/frame may be molded as a single piece from acrylonitrile butadiene styrene (ABS), polycarbonate, high density polyethylene (HDPE), or any other suitable rigid or semi-rigid material. According to an exemplary embodiment, the bezel/base/frame may be formed from multiple pieces that are subsequently assembled.

As shown schematically in FIG. 2, the door 30 includes a cover 34. Door 30 provides a storage compartment 50; storage compartment 50 provides an interior volume where items may be stored. As shown schematically in FIG. 2, storage compartment 50 is sized and shaped to accommodate sunglasses or other types of eyeglasses. According to an exemplary embodiment, storage compartment may be sized and shaped for storing other items (e.g. portable electronic devices, keys, money, tissues, etc.); storage compartment 50 may be lined with fabric or other soft materials to protect the stored item from scratches.

As shown schematically in FIG. 2A, fixtures 58 for supporting the door 30 are located at opposing ends of bezel/base/frame 20. Door 30 is supported by pins 66 extending from the side walls of door 30 through corresponding holes 74 in fixtures 58. Door 30 rotates around axles 66 between a closed position (see FIG. 4A), an open position (see FIG. 4C), and an intermediate position (see FIG. 4B).

According to an exemplary embodiment, a spring shown as torsion spring 82 (see FIG. 4A) rotates door 30 toward the intermediate position. According to an exemplary embodiment, torsion spring 82 may be omitted; door 30 may open by gravity. According to an exemplary embodiment, console assembly 10 may further include a rotary damper to resist abrupt deployment of door 30 from the closed position to the intermediate position. The damper may consist of a chamber fixed to the bezel/base/frame 20 and one or more blades located on door 30 (e.g. on one or both of the axles 66). The viscosity chamber is filled with a high viscosity fluid, such as oil, to resist movement of the blades and slow the rotation of door 30.

As shown schematically in FIG. 3, console assembly 10 further includes a spring clip 86 supported by a fixture 58 on base 20. According to an exemplary embodiment, spring clip 86 is V-shaped and includes two legs. The spring clip 86 is formed from a piece of metal (e.g. steel) by a stamping and bending process. According to an exemplary embodiment, spring clip 86 may be made of other materials having the desired strength and elasticity.

As shown schematically in FIG. 3, one leg of spring clip 86 is secured to the fixture 58 on base 20 by seat 102a, seat 102b and block 103 extending from the fixture 58. The spring 86 may be secured to the bezel/base/frame 20 by inserting one leg of spring clip 86 between the seat 102a, seat 102b and block 103 without requiring the use of external tools or additional fasteners, adhesives, etc. As shown schematically in FIG. 3, the fixed leg of spring clip 86 is shaped to fit the contour of a recess 110 located on block 103 to further secure the spring clip 86 to the bezel/base/frame 20; recess 110 defines a set location for the spring clip 86 relative to the bezel/base/frame 20.

As shown schematically in FIG. 2, a surface 122 is located adjacent to the side wall of door and fixed to door 30; surface 122 may be formed with the door 30 or may be formed separately and attached to the door 30. According to an exemplary embodiment, the positions of spring clip 86 and surface 122 may be reversed; surface 122 may be located on bezel/base/frame 20; spring clip 86 may be secured to door 30. Surface 122 bears against the free leg of spring clip 86 to compress spring clip 86 when door 30 moves the bezel/base/frame 20 from the intermediate position to the opened position.

As shown schematically in FIG. 4A, door 30 (in the closed position) is oriented such that cover 34 of door 30 is aligned with the bottom of bezel/base/frame 20. The storage compartment 50 is between cover 34 of door 30 and the interior of roof of the vehicle such that the storage compartment 50 is inaccessible and concealed from view. According to an exemplary embodiment, console assembly 10 may comprise a latch mechanism which retains the door 30 in the closed position; door 30 may be manipulated by the user to disengage the latch and permit the door 30 to rotate towards the intermediate position.

As shown schematically in FIG. 4B, door 30 is in the intermediate position; surface 122 on door 30 come into contact with a rounded end of the free leg of spring clip 86. Door 30 is stopped by the spring clip 86; torque applied to door 30 by torsion spring 82 is insufficient to compress spring clip 86. Spring clip 86 is in a neutral (e.g. uncompressed) state when the door 30 is in the intermediate position. As shown schematically in FIG. 4B, cover 34 for door 30 is perpendicular to the bezel/base/frame 20 in the intermediate position. According to an exemplary embodiment, orientation may vary depending on the size and position of spring clip 86 and the contour of surface 122.

As shown schematically in FIG. 4C, door 30 may be opened by a finger of hand H; spring clip 86 is compressed at the open position. As door 30 rotates, the rounded end of spring clip 86 slides along surface 122 of door 30, compressing spring clip 86 until the free leg of spring clip 86 comes into contact with block 103. According to an exemplary embodiment, contact between block 103 and spring clip 86 prevents door 30 from rotating beyond the open position. At the open position, the angle A between the cover 34 and bezel/base/frame 20 is about 120 degrees. According to an exemplary embodiment, the force required to move the door 30 to the opened position may varying depending on the overall size, thickness, geometry, or material of the spring clip; the orientation of the door relative to the bezel/base/frame in the opened position may vary depending on the size and position of the spring clip and the cam surface of door.

As shown schematically in FIG. 4A, door 30 is in the closed position; storage compartment 50 is inaccessible and concealed from view; the console assembly 10 has a flush appearance and prevents the door 30 from obstructing a user's view during operation of the vehicle.

As shown schematically in FIG. 4A, to open the compartment 30 a user pushes against the door cover 34 to disengage a latch. Door 30 rotates to the intermediate position by torque provided by torsion spring 82 and/or gravity. The surface 122 of the door 30 comes into contact with the rounded end of the spring clip 86 to stop door 30 at the intermediate position (see FIG. 4B). A clearance distance D between the storage compartment 50 and the bezel/base/frame 20 may be insufficient to store or remove an item from the storage compartment 50.

As shown schematically in FIG. 4C, door 30 may further rotate to the opened position to increase the clearance distance D. As shown schematically in FIG. 4C, the user pushes with a finger of hand H on door 30 to overcome the resistance of spring clip 86. As door 30 rotates the rounded end of spring clip 86 slides along the surface 122 of door 30 compressing spring clip 86. As shown schematically in FIG. 4C, door 30 reaches the opened position; the free leg of spring clip 86 contacts block 103 on the bezel/base/frame 20 to limit the travel of the door 30. At the opened position the user may easily store or remove an item from the storage compartment 50. According to an exemplary embodiment, by letting go of door 30 the force provided by spring clip 86 causes door 30 to return to the intermediate position (see FIG. 4B). The user may then push against door cover 34 to return the door 30 to the closed position and engage the latch.

As shown schematically in FIG. 5, console assembly 210 includes a frame or bezel 220 and door 230. Door 230 includes a cover 234, two opposing side walls and a back wall 246. A storage compartment 250 having an interior volume may store items such as sunglasses. See FIG. 5. As shown schematically in FIG. 5, a mirror 340 (e.g. for viewing rear seats of the vehicle) is mounted on the back wall 246 of the door 230. According to an exemplary embodiment, the mirror 340 is convex to provide a wider view. According to an exemplary embodiment, the mirror 340 may be flat, concave or have any other geometry; the mirror 340 may be omitted.

As shown schematically in FIG. 5, fixtures 258 for supporting the door 230 are located at opposing ends of the bezel/base/frame 220. Door 230 is supported by axles 266 extending from the side walls and through holes 274 in the fixtures 258. Door 230 rotates the axle 266 between a closed position (see FIG. 7A), an open position (see FIG. 7C), and an intermediate position (see FIG. 7B).

As shown schematically in FIG. 6, console assembly 210 further includes a spring clip 286 supported by base 220. According to an exemplary embodiment, spring clip 286 is V-shaped and includes two legs joined by a bend. See FIG. 6. Spring clip 286 is formed from a piece of metal (e.g. steel) by a stamping and bending process; spring clip 286 may be made of other materials having the desired strength and elasticity.

As shown schematically in FIG. 6, one leg of spring clip 286 is secured to the base 220 by a seat 302b and a block 302a extending from fixture 258; spring clip 286 may be secured to base 220 by inserting one leg of spring clip 286 between seat 302b and block 302a on base 220 without requiring the use of external tools or additional fasteners, adhesives, etc. According to an exemplary embodiment, the fixed leg of spring clip 286 includes a bent end and a detent partially punched from the bent end. The detent engages the seat 302*b* to further secure spring clip 286 to the base 220. The bent end and the detent define a set location for spring clip 286 relative to base 220.

As shown schematically in FIG. 5, a pin or post 314 is located adjacent to the side wall and fixed to door 230; pin 314 may be formed with door 230 or may be formed separately and attached to door 230. According to an exemplary embodiment, the positions of the spring clip 286 and the pin may be reversed such that the pin is located on the base and the spring clip is secured to the door 230. As shown schematically in FIG. 5, the free leg of the spring clip 286 includes a hooked end 326 (see FIG. 6) that secures the hooked end 326 to the post 314.

As shown schematically in FIG. 7A, door 230 is in the closed position; the cover 234 of the door is aligned with the bottom of base 220 to close door 230. See FIG. 7A. Storage compartment 250 is between cover 234 and the interior of the roof of the vehicle such that both storage compartment 250 and mirror 340 are inaccessible and concealed from view; spring clip 286 is in an expanded state; door 230 is biased toward the intermediate position. According to an exemplary embodiment, console assembly 210 may provide a latch retaining door 230 in the closed position against the force of the spring clip 286. Cover 234 of door 230 may be manipulated by the user to disengage the latch and permit door 230 to rotate towards the intermediate position.

As shown schematically in FIG. 7B, door 230 is in the intermediate position; the spring clip 286 is in a neutral (e.g. uncompressed and unexpanded) state. According to an exemplary embodiment, the angle between cover 234 of door 230 and base 220 are about 30 degrees. According to an exemplary embodiment, the orientation may vary depending on the size and position of spring clip 286 and pin 314. In the intermediate position, storage compartment 250 remains inaccessible; mirror 340 is exposed and visible to the user.

As shown schematically in FIG. 7C, door 230 may open further to the opened position by an external force provided by a finger of hand H to compress spring clip 286 (e.g. to reduce the angle between the two legs of spring clip 286). According to an exemplary embodiment, door 230 rotates to the opened position; pin 314 acts on the round hook 326 at the end of spring clip 286 to compress spring 286. See FIG. 7C. In the opened position, the angle A between cover 234 of door 230 and base 220 is about 120 degrees. According to an exemplary embodiment, the force required to move door 230 to the opened position may be tuned by varying the overall size, thickness, geometry or material of the spring clip; the orientation of door 230 to the base in the opened position may vary depending on the size and position of the spring clip and the pin 314.

As shown schematically in FIG. 7A, door 230 is in the closed position; the storage compartment 250 and the mirror 340 are inaccessible and concealed from view providing the console assembly 210 with a flush appearance and prevent the door 230 from obstructing a user's view during operation of the vehicle.

As shown schematically in FIG. 7B, a user pushes against the cover 234 to disengage the latch. Door 230 rotates to the intermediate position by torque provided by spring clip 286; spring clip 286 resumes its neutral (e.g. uncompressed or unstretched) state, exposing the mirror 340 (see FIG. 7B) allowing the user (e.g. the driver of the vehicle) to view the rear seats of the vehicle.

As shown schematically in FIG. 7C, to access the storage compartment 250 the user may rotate the door 230 to the opened position (e.g. by exerting a force on the door 230, compressing the spring clip 286). See FIG. 7C. In the opened position the user may store or remove items from storage compartment 250. As shown schematically in FIG. 9D, the user removes force from the finger (e.g. by letting go of the door 230) and the force of spring clip 286 causes the door 230 to return to the intermediate position. The user may then push against the cover 234 to return the door 230 to the closed position and engage the latch. See FIG. 7A.

As shown schematically in FIG. 2, a console assembly comprises a frame; a door including a storage compartment defining a storage space into which an article may be stored. The storage member (e.g. door) coupled to the frame for movement to the frame between a closed position (the storage compartment is substantially inaccessible) (see FIG. 4A), an opened position (the storage compartment is accessible to store or remove the article) (see FIG. 4C) and an intermediate position (between the closed position and the opened position) (see FIG. 4B). A spring coupled to one of the frame and the door and a cam surface on the other of the frame and door that may be engaged with the spring. See FIG. 4B. The spring is compressed by the cam surface when the door is in the opened position to bias the door toward the intermediate position. See FIG. 4C.

The spring is in a compressed state when the door is in the opened position; the spring is in a neutral state when the door is in the intermediate position. See FIGS. 4B and 4C. The spring is generally V-shaped and includes a first leg and a second leg. See FIGS. 2 and 3.

An included angle defined between the first leg and the second leg decreases when the spring is compressed by the cam surface. See FIGS. 4B and 4C. The first leg and the frame include a detent and the other of the first leg and the frame includes a recess in which the detent is received to secure the first leg to the frame. See FIG. 4A. The second leg includes a rounded end configured to slide relative to the cam surface as the door moves from the intermediate position to the opened position. See FIGS. 4B and 4C. Compression of the spring is limited by contact between the second leg and a stop located on the frame. See FIG. 4C. The spring is coupled to the frame and the cam surface is located on the door; the cam surface is spaced from the spring when the door is in the closed position. See FIG. 4A.

A biasing member is configured to bias the door toward the intermediate position; biasing member is a torsion spring; torque exerted on the door by the biasing member is insufficient to rotate the door from the intermediate position to the opened position. See FIG. 4B. A console assembly comprises a frame; a door supporting a mirror and including a storage compartment defining a storage space into which an article may be stored. The door being coupled to the frame for movement to the frame between a closed position (the storage compartment and the mirror are substantially inaccessible) (see FIG. 4A), an opened position (the storage compartment is accessible to store or remove the article) (see FIG. 4C) and an intermediate position (between the closed position and the opened position in which the mirror is substantially exposed) (see FIG. 4B). A spring is coupled to one of the frames and the door and a cam surface on the other of the frame and the door that is engaged with the spring. See FIGS. 4B and 4C.

The spring biases the door toward the intermediate position when the door is in the closed position and when the door is in the opened position; the spring is in a neutral state when the door is in the intermediate position. The spring is in a compressed state when the door is in the opened position; the spring is in an expanded state when the door is in the closed position. See FIG. 7A. The spring is generally V-shaped and includes a first leg and a second leg.

The first leg and the frame include a detent and the other of the first leg and the frame includes a recess configured to receive the detent to secure the first leg of the spring to the frame. See FIG. 6. The spring is coupled to the frame and the cam surface is located on the door. The mirror is a convex mirror (e.g. to view occupants in the rear seat). See FIG. 5.

It is important to note that the construction and arrangement of the elements of the inventive concepts and inventions as described in this application and as shown in the figures is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions may comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console for a vehicle interior comprising:
   (a) a base;
   (b) a compartment pivotally coupled to the base for movement between a closed position and an open position for access;
   (c) a first spring configured to provide a force to actuate the compartment for movement relative to the base;
   (d) a second spring configured to provide a stop of movement of the compartment between the closed position and the open position;
   wherein the compartment is configured for movement to (a) a first state with the compartment retained in the closed position; (b) a second state with the compartment under force from the first spring moving to the stop; (c) a third state with the compartment at the stop; (d) a fourth state with the compartment moved beyond the stop against the second spring;
   wherein the second spring is generally V-shaped and includes a first leg and a second leg.

2. The console of claim 1 wherein the first leg of the second spring is compressed toward the second leg of the second spring when the compartment is in the fourth state.

3. The console of claim 2 wherein the first leg of the second spring is configured to slide relative to a surface of the compartment in the fourth state.

4. The console of claim 1 wherein the second spring comprises at least one of (a) a spring clip, (b) a lever spring.

5. The console of claim 1 wherein the first spring is in compression in the first state.

6. The console of claim 1 wherein the first spring is in tension in the second state, in the third state and in the fourth state.

7. The console of claim 1 wherein the second spring is in compression by external force in the fourth state.

8. The console of claim 1 further comprising a latch between the base and the compartment wherein the compartment is latched in the closed position in the first state.

9. The console of claim 1 wherein the console comprises an overhead console and wherein the base comprises a frame.

10. The console of claim 1 wherein external force is applied manually.

11. A console for a vehicle interior comprising:
    (a) a base;
    (b) a compartment comprising a mirror and pivotally coupled to the base for movement between a closed position and an open position for access; and
    (c) a spring coupled to the base and configured to provide a force;
    wherein the compartment is configured for movement to (a) a first state with the compartment in the closed position and the mirror within the base; (b) a second state with the compartment under force from the spring; (c) a third state with the compartment with the mirror deployed from the base; (d) a fourth state with the compartment in the open position; and
    wherein the spring is configured to provide force to move the compartment from the first state with the compartment in the closed position to the third state with the compartment deployed and from the fourth state with the compartment in the open position to the third state with the compartment deployed.

12. The console of claim 11 wherein the spring is in tension in the first state and in compression in the fourth state.

13. The console of claim 11 wherein the compartment is latched in the first state and wherein the compartment is unlatched in the second state, in the third state, and in the fourth state.

14. The console of claim 11 wherein external force is applied to the compartment to overcome the force provided by the spring to move the compartment from the third state to the fourth state.

15. A console for a vehicle interior configured to be operable under an external force applied by an occupant comprising:
    (a) a base;
    (b) a compartment structure coupled to the base; and
    (c) a spring configured to actuate movement of the compartment structure relative to the base;
    wherein the compartment structure is configured for movement (1) from a closed position to an intermediate stop at an intermediate position actuated by a force provided by the spring; (2) from the intermediate position toward a full stop for an open position by application of the external force; and (3) from the open position to the intermediate stop at the intermediate position upon release of the external force.

16. The console of claim 15 wherein the compartment structure is configured for movement from the intermediate position toward the open position by application of an external force against a force provided by the spring.

17. The console of claim 15 wherein the compartment structure is configured for movement from the open position to the intermediate position by a force provided by the spring.

18. The console of claim 15 further comprising a second spring; wherein the compartment structure is configured for movement from the intermediate position toward the open position by application of an external force opposing a force provided by the second spring.

19. The console of claim 18 wherein the compartment structure is configured for movement from the open position to the intermediate position actuated by the second spring.

20. The console of claim 18 wherein the compartment structure comprises a compartment; wherein the compartment structure is configured for movement (4) from the intermediate position to the closed position; wherein the second spring comprises at least one of (a) a spring clip, (b) a lever spring.

* * * * *